(12) United States Patent
Hasegawa

(10) Patent No.: US 6,597,414 B1
(45) Date of Patent: Jul. 22, 2003

(54) HORIZONTAL ELECTRIC-FIELD TYPE LCD DEVICE

(75) Inventor: Fumio Hasegawa, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 09/513,923

(22) Filed: Feb. 28, 2000

(30) Foreign Application Priority Data

Feb. 26, 1999 (JP) .......................................... 11-051188

(51) Int. Cl.⁷ ...................... G02F 1/1333; G02F 1/1343
(52) U.S. Cl. ......................................... 349/40; 349/141
(58) Field of Search ...................... 349/58, 141, 149, 349/152, 1, 40; 439/65, 74

(56) References Cited

U.S. PATENT DOCUMENTS 5,870,160 A * 2/1999 Yanagawa et al. .......... 349/141

FOREIGN PATENT DOCUMENTS

| JP | 6-347814 | 12/1994 |
| JP | 9-105918 | 4/1997 |

* cited by examiner

Primary Examiner—Toan Ton
Assistant Examiner—Dung Nguyen
(74) Attorney, Agent, or Firm—McGinn & Gibb, PLLC

(57) ABSTRACT

A horizontal electric-field type LCD device is provided, which prevents the display quality from degrading due to unwanted electric field with a thin and simple structure. This device is comprised of (a) a first transparent substrate; (b) a protecting conductive layer formed on an outer surface of the first substrate; (c) a second transparent substrate coupled with the first substrate to form a space between inner surfaces of the first and second substrates; the second substrate having an extended part that extend from the periphery of the first substrate; (d) a grounding electrode formed on the inner surface of the extended part of the second substrate; (e) a liquid crystal confined in the space formed between the inner surfaces of the first and second substrates; and (f) a conductive, elastic connection member for electrically interconnecting the conductive layer on the first substrate with the grounding electrode on the second substrate. The connection member has a base part engaged with an outer surface of the second substrate, a first spring part engaged with the conductive layer on the first substrate, and a second spring part engaged with the grounding electrode on the second substrate.

10 Claims, 3 Drawing Sheets

HORIZONTAL ELECTRIC-FIELD TYPE LCD DEVICE

BACKGROUND OF THE INVENTION

1. Field of the Invention

The present invention relates to a Liquid-Crystal Display (LCD) device and more particularly, to an LCD device using the horizontal electric-field running approximately parallel to a pair of glass substrates in a liquid crystal layer, which prevents the display quality from degrading due to static electricity charged on one or both of the substrates and so on.

2. Description of the Prior Art

In recent years, LCD devices have been extensively used as display terminals for electronic equipment, such as personal computers and word processors. This is because LCD devices have advantages that they dissipate low electric power, they are compact and light-weight, and they are operable at a low supply voltage.

LCD devices have various driving methods such as the static driving, multiplex driving, and active matrix driving methods, all of which have been used in practice. Nowadays, the active matrix driving method has formed its main stream.

LCDs using the active matrix driving method, i.e., active-matrix LCDs, are divided into two groups by the difference in electrode structure; the vertical electric-field and horizontal electric-field types.

With the vertical electric-field type LCDs, a liquid crystal is confined in the space between first and second glass substrates coupled together to be opposite and parallel. Display electrodes for forming pixels and Thin-Film Transistors (TFTs) for selecting the pixels to be driven are formed on the first substrate. A common electrode is formed on the second substrate to be opposite to the display electrodes. A driving voltage is selectively applied across desired ones of the display electrodes and the common electrode, thereby applying a vertical electric-field to the liquid crystal. Thus, the orientation of the molecules of the liquid crystal is changed continuously from the horizontal direction to the vertical one, thereby controlling or modulating the transmitted light through the liquid crystal layer.

The vertical electric-field type LCDs have the following disadvantage.

Specifically, when a user look at the display area of the LCD device of this type obliquely, he tends to see sudden change in brightness or inversion of light and shade. In other words, the LCDs of this type have a bad viewing-angle characteristic. This is because the molecules of the liquid crystal that have been aligned vertically with respect to the substrates have different apparent lengths for the user.

On the other hand, with the horizontal electric-field type LCDs, a liquid crystal is confined in the space between first and second glass substrates coupled together to be opposite and parallel. This structure is the same as that of the vertical electric-field type ones. Unlike the vertical electric-field type ones, display electrodes for forming pixels, TFTs for selecting the pixels to be driven, and reference electrodes are formed on the first substrate. No electrodes are formed on the second substrate. A driving voltage is selectively applied across desired ones of the display electrodes and those of the reference electrodes, thereby applying a horizontal electric-field to the liquid crystal. Thus, the orientation of the molecules of the liquid crystal is changed continuously from the vertical direction to the horizontal one, thereby controlling or modulating the transmitted light through the liquid crystal layer.

With the horizontal electric-field type LCD devices, unlike the vertical electric-field type ones, the above-described disadvantage of the bad viewing-angle characteristic can be improved. This is because the molecules of the liquid crystal that have been aligned horizontally with respect to the substrates have a small difference in apparent length. However, the LCD devices of this type might have a problem that the display quality tends to degrade. For example, if the LCD device is of the normally black mode, the display area tends to be partially or entirely turned white. If the LCD device is of the normally white mode, it tends to be partially or entirely turned black. The problem is caused by the following reason.

Specifically, the second substrate (to which no electric-field is directly applied) might be electrified due to static electricity or some unintended electric-field, which may be applied from the outside of the LCD device. In this case, electric charges are stored on the second substrate and therefore, they create unwanted vertical electric-field with respect to the first and second substrates in the liquid crystal layer. Thus, the orientation of the molecules of the liquid crystal tends to be changed toward the vertical direction due to the unwanted vertical electric-field, resulting in degradation of the display quality.

To solve the above-described problem of display quality degradation in the horizontal electric-field type LCD devices, various solutions have been developed and reported. An example of the solutions is disclosed in the Japanese Non-Examined Patent Publication No. 9-105918 published in April 1997.

FIGS. 1 and 2 show the structures of the prior-art horizontal electric-field type LCD devices disclosed in the Publication No. 9-105918.

In FIG. 1, a glass substrate 101 and another glass substrate 102 are coupled together to be opposite and parallel, forming a space therebetween. The space is sealed by a sealing member 109 located along the whole periphery of the substrate 101. Liquid crystal LC is confined in the sealed space, forming a liquid-crystal layer. Although not shown in FIG. 1, display electrodes, reference electrodes, and TFTs are formed on the inner surface of the substrate 102.

A transparent conductive layer 103 is additionally formed on the outer surface of the substrate 101. A metal frame 104, which surrounds entirely the substrate 101 as a casing, is mechanically and electrically connected to the conductive layer 103 at the periphery of the substrate 101 by way of a conductive rubber layer 105. Thus, even if electric charges are stored on the substrate 101, they are quickly discharged toward outside through the conductive layer 103, the conductive rubber layer 105, and the frame 104, thereby preventing the display quality from degrading due to any unwanted vertical electric-field existing in the liquid crystal LC.

The structure of the prior-art LCD device shown in FIG. 2 is the same as that shown in FIG. 1, except that the transparent conductive layer 103 is electrically connected to a grounding terminal 106 formed on the inner surface of the substrate 102 by way of a cable 107.

The above-identified Publication No. 9-105981 further discloses that a conductive paste or a conductive metal tape may be used instead of the cable 107. The conductive metal tape is formed by a metal tape and an adherent material containing a conductive substance.

The prior-art LCD devices shown in FIGS. 1 and 2 have problems explained below.

With the prior-art LCD device shown in FIG. 1, the conductive rubber layer 105 is used to electrically connect
} the conductive layer 103 to the metal frame 104 and therefore, the thickness of the LCD device becomes larger. In recent years, there has been the strong need that the thickness of LCD devices is set to be possibly smaller. From this point of view, the structure of FIG. 1 is not preferred.

Also, when the metal frame 104 is connected to the substrate 101, the rubber layer 105 needs to be strongly pressed onto the substrate 101 in order to stabilize the contact resistance of the rubber layer 105. At this stage, a counter force to the pressing force is applied to the frame 104 and as a result, some deformation tends to occur in the frame 104. Thus, the pressing force is unable to be set to be as high as desired.

Furthermore, according to the result of the inventor's test, the following problem was found.

Specifically, when a pressure equal to or greater than a specific value is applied to the substrate 101 in the adhesion process of the frame 104, there arises a phenomenon that the display area might be turned to be white or black at a corresponding location to the pressure-applied part in spite of no electric-field being applied to the substrate 101. If the LCD device is of the normally black mode, the display area tends to be turned white. If the LCD device is of the normally white mode, the display area tends to be turned black.

As a result, because of the two above-described reasons, the pressing force applied to the substrate 101 in the adhesion process of the frame 104 needs to be set to be equal to or lower than a specific value.

Furthermore, with the LCD device shown in FIG. 2, since the cable 107 needs to be used, there is a problem that a complicated process is required for interconnecting the conductive layer 103 with the grounding terminal 106 by way of the cable 107.

There arises a problem that a similar complicated process is needed if the conductive paste or conductive metal tape is used instead of the cable 107. Also, in this case, the following problem will occur.

Specifically, when the conductive paste is used, it tends to flow toward the substrate 102 due to the gravity in the interconnection process of the conductive layer 103 and the grounding terminal 106. Thus, the coated paste is difficult to have a desired thickness or cross-sectional area. In particular, the thickness of the coated paste tends to be decreased at the corner 108 of the conductive layer 103. As a result, the electric resistance of the coated paste tends to fluctuate in a wide range, which causes a possibility that the unwanted electric charges on the substrate 101 are unable to be fully removed.

When the conductive metal tape is used, there is a possibility that a satisfactory adhesion strength of the tape is unable to be produced. This is because the tape contains a conductive substance in the adherent material and therefore, the surface area effective to adhesion of the tape is decreased.

SUMMARY OF THE INVENTION

Accordingly, an object of the present invention is to provide a horizontal electric-field type LCD device that prevents the display quality from degrading due to unwanted electric field with a thin and simple structure.

Another object of the present invention is to provide a horizontal electric-field type LCD device that requires no complicated process for electrically interconnecting a protecting conductive layer on a substrate with a grounding electrode on another substrate.

Still another object of the present invention is to provide a horizontal electric-field type LCD device that provides proper pressing forces for a protecting conductive layer on a substrate and a grounding electrode on another substrate.

A further object of the present invention is to provide a horizontal electric-field type LCD device that makes it easy to replace a driver IC (Integrated Circuit).

The above objects together with others not specifically mentioned will become clear to those skilled in the art from the following description.

A horizontal electric-field type LCD device according to the present invention is comprised of:
(a) a first transparent substrate;
(b) a protecting conductive layer formed on an outer surface of the first substrate;
(c) a second transparent substrate coupled with the first substrate to form a space between inner surfaces of the first and second substrates;
   the second substrate having an extended part that extend from the periphery of the first substrate;
(d) a grounding electrode formed on the inner surface of the extended part of the second substrate;
(e) a liquid crystal confined in the space formed between the inner surfaces of the first and second substrates; and
(f) a conductive, elastic connection member for electrically interconnecting the conductive layer on the first substrate with the grounding electrode on the second substrate;
   the connection member having a base part engaged with an outer surface of the second substrate, a first spring part engaged with the conductive layer on the first substrate, and a second spring part engaged with the grounding electrode on the second substrate.

With the horizontal electric-field type LCD device according to the present invention, the protecting conductive layer on the outer surface of the first substrate and the grounding electrode on the inner surface of the extended part of the second substrate are electrically interconnected with each other by way of the conductive, elastic connection member. Thus, even if electrification occurs on the first substrate to create electric charges thereon, these electric charges flow quickly to the grounding electrode through the connection member. As a result, the display quality does not degrade due to the unwanted electric field generated by the electric charges on the first substrate.

Also, the connection member has the base part engaged with the outer surface of the second substrate, the first spring part engaged with the conductive layer on the outer surface of the first substrate, and the second spring part engaged with the grounding electrode on the inner surface of the second substrate. Therefore, the structure of the LCD device can be made thin and simple. At the same time as this, the member can be easily attached to the first and second substrates and easily detached therefrom, which means that a driver IC can be easily replaced.

Furthermore, since the cable and the conductive rubber layer are not used, no complicated process is required for electrically interconnecting the conductive layer with the grounding electrode.

Moreover, elastic deformation occurs independently in the first and second spring parts of the connection member. Therefore, proper pressing forces can be provided for the respective engagements of the first and second spring parts, which stabilizes these engagements.

In a preferred embodiment of the device according to the present invention, the first spring part and the base part of the connection member form an approximately U-shaped cross section, and the second spring part and the base part of the connection member form an approximately U-shaped cross section. In this embodiment, there is an additional advantage that the connection member can be formed by a thin metal plate or sheet while the electric resistance of the member is kept satisfactorily low. This means that the LCD device can be compact and that stable electrical connection between the protecting conductive layer and the grounding electrode is ensured.

In another preferred embodiment of the device according to the present invention, the connection member is made of a material selected from the group consisting of stainless steel, phosphor bronze, and beryllium copper. In this embodiment, there is an additional advantage that the connection member can be mechanically processed easily and has a good durability.

In still another preferred embodiment of the device according to the present invention, the base part of the connection member is engaged with the outer surface of the second substrate by way of a rubber sheet. In this embodiment, there is an additional advantage that the mechanical engagement of the base part of the connection member with the second substrate is reinforced, thereby decreasing the danger that the engagement between the member and the second substrate is released due to applied vibration or shock.

It is preferred that the rubber sheet is adhered to the base part of the connection member. In this case, the mechanical engagement of the base part with the second substrate is further reinforced.

In a further preferred embodiment of the device according to the present invention, the first spring part of the connection member is designed to apply a pressure of approximately 30 gw/cm$^2$ (=2941.995 Pa) or lower to the protecting conductive layer. In this embodiment, there is an additional advantage that the possibility that the display area is unintentionally turned to white or black can be prevented, because the applied pressure to the first substrate is limited. This leads to further improvement of the display quality.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
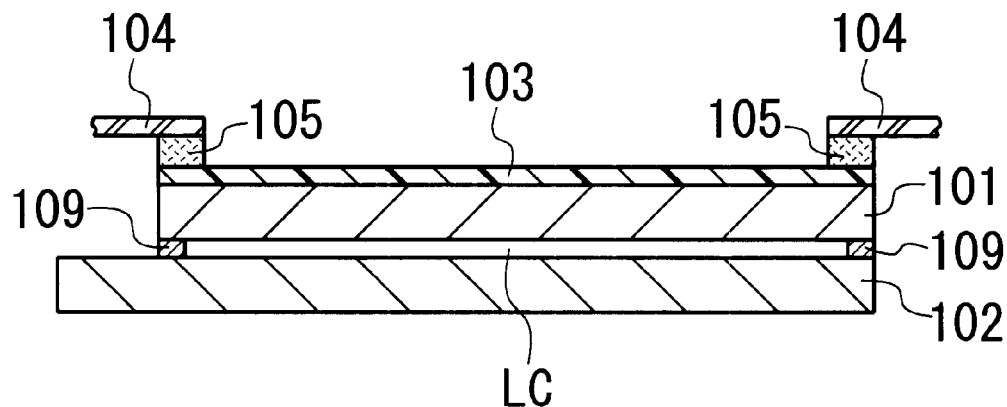
FIG. 1 is a schematic cross-sectional view of a prior-art horizontal electric-field type LCD device.

Preferred embodiments of the present invention will be described in detail below while referring to the drawings attached.

First Embodiment

Figure 3:
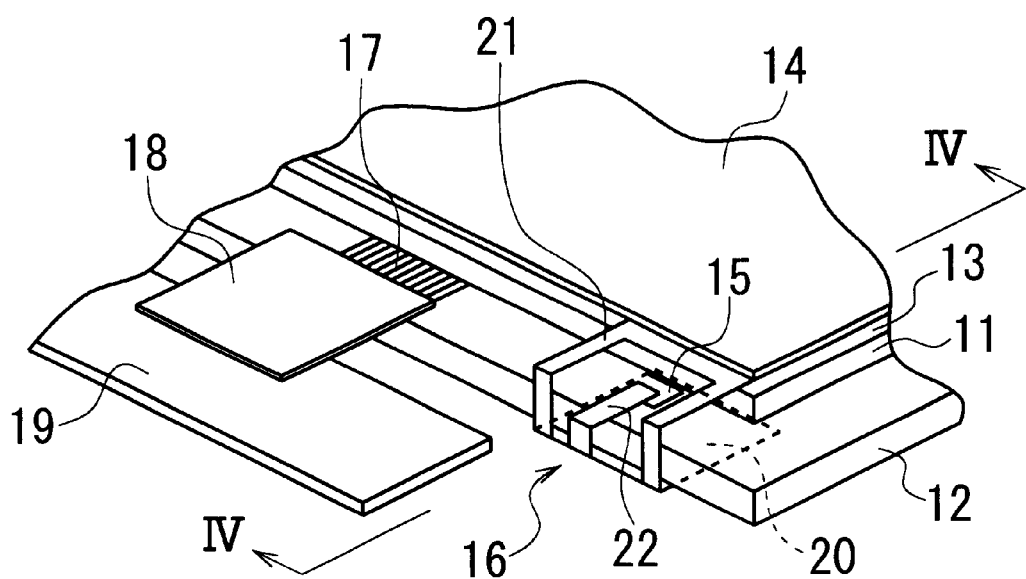
FIG. 3 is a schematic, partial, perspective view of a horizontal electric-field type LCD device according to a first embodiment of the present invention.
Figure 4:
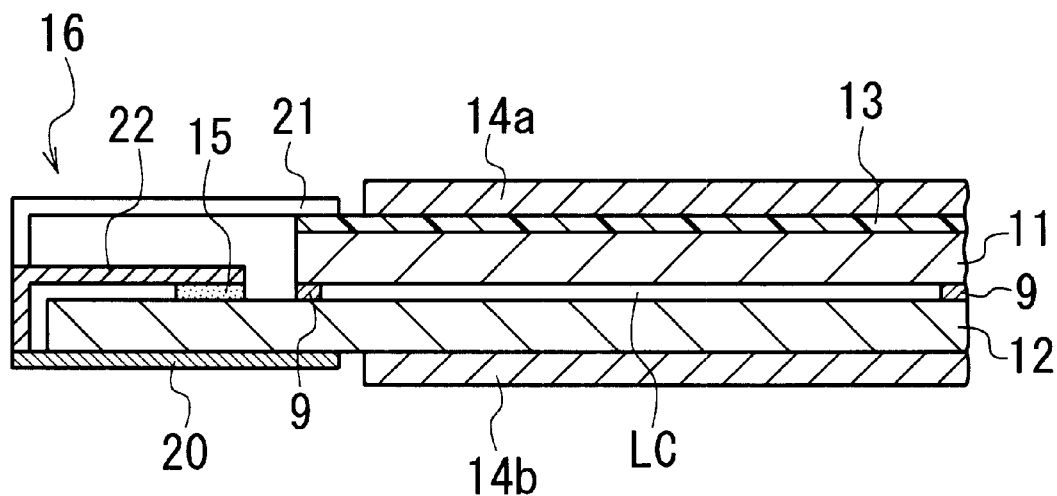
FIG. 4 is a schematic, partial cross-sectional view of the LCD device according to the first embodiment of the invention along the line IV—IV in FIG. 3.

A horizontal electric-field type LCD device according to a first embodiment has a configuration as shown in FIGS. 3 and 4.

As seen from FIGS. 3 and 4, the LCD device is comprised of a first transparent glass substrate 11 and a second transparent glass substrate 12, which are coupled together to form a space between the inner surfaces of the substrates 11 and 12. Each of the substrates 11 and 12 is rectangular and flat. The second substrate 12 is slightly larger than the first substrate 11. Specifically, the four sides of the second substrate 12 protrude from the corresponding sides of the first substrate 11 by approximately 3 mm.

A backlight unit (not shown) is located on the side of the second substrate 12. A user looks the display area of the LCD device from the side of the outer surface of the first substrate 11.

A sealing member 9 is formed to extend along the whole periphery of the first substrate 11, thereby sealing the space formed between the inner surfaces of the substrates 11 and 12. The space is filled with a liquid crystal LC.

A rectangular, transparent conductive layer 13, which is used for protecting the LCD device from an unwanted electric field or preventing the abnormal display, is formed on the outer surface of the first substrate 11. The layer 13 covers almost all the outer surface of the first substrate 11. Here, the layer 13 is made of Indium Tin Oxide (ITO) and has a thickness of 200 to 300 Å.

A rectangular polarizer plate 14a is located on the conductive layer 13. The four sides of the plate 14a are sunk from the four corresponding sides of the first substrate 11 by approximately 1.5 mm.

A rectangular polarizer plate 14b is located on the outer surface of the second substrate 12. The plate 14b has the same size as that of the plate 14a. The backlight (not shown) is located near the polarizer plate 14b.

Although not shown, TFTs, reference electrodes, and display electrodes are formed on the inner surface of the second substrate 11. Since the structures of the TFTs and the reference and display electrodes are well known, the detailed explanation about them is omitted here for simplification. For example, they are disclosed in the previously-identified Japanese Non-Examined Patent Publication No. 9-105981.

On the protruded or extended part of the second substrate 12 from the first substrate 11, as shown in FIG. 3, wiring lines 17 and a rectangular grounding electrode 15 are formed. The wiring lines 17, which are made of a conductive metal such as chromium (Cr) and aluminum (Al), are electrically connected to the display electrodes. The grounding electrode 15 is located near one corner of the second substrate 12 apart from the wiring lines 17.

The wiring lines 17 are electrically connected to corresponding terminals of a driver IC 18 for driving the LCD device of the first embodiment. The IC 18 is electrically connected to a Printed Wiring Board (PWB) 19 located near the IC 18. The PWB 19 is used for processing the signals in the LCD device. The grounding electrode 15 is electrically connected to the PWB 19 through a wiring line (not shown) formed on the second substrate 12 and that formed in the IC 18. Here, the IC 18 is in the form of a Tape Carrier Package (TCP). The PWB 19 is electrically connected to a terminal (not shown) held at a ground-level potential. Thus, the grounding electrode 15 is kept at the ground-level potential.

A conductive connection member 16, which has a spring function, is detachably attached to the first and second substrate 11 and 12, as shown in FIGS. 3 and 4. The member 16 is obtained by press-forming a stainless steel sheet with a thickness of 0.1 mm using a specific mold or molds. The detailed structure of the member 16 is shown in FIG. 5.

Figure 5:
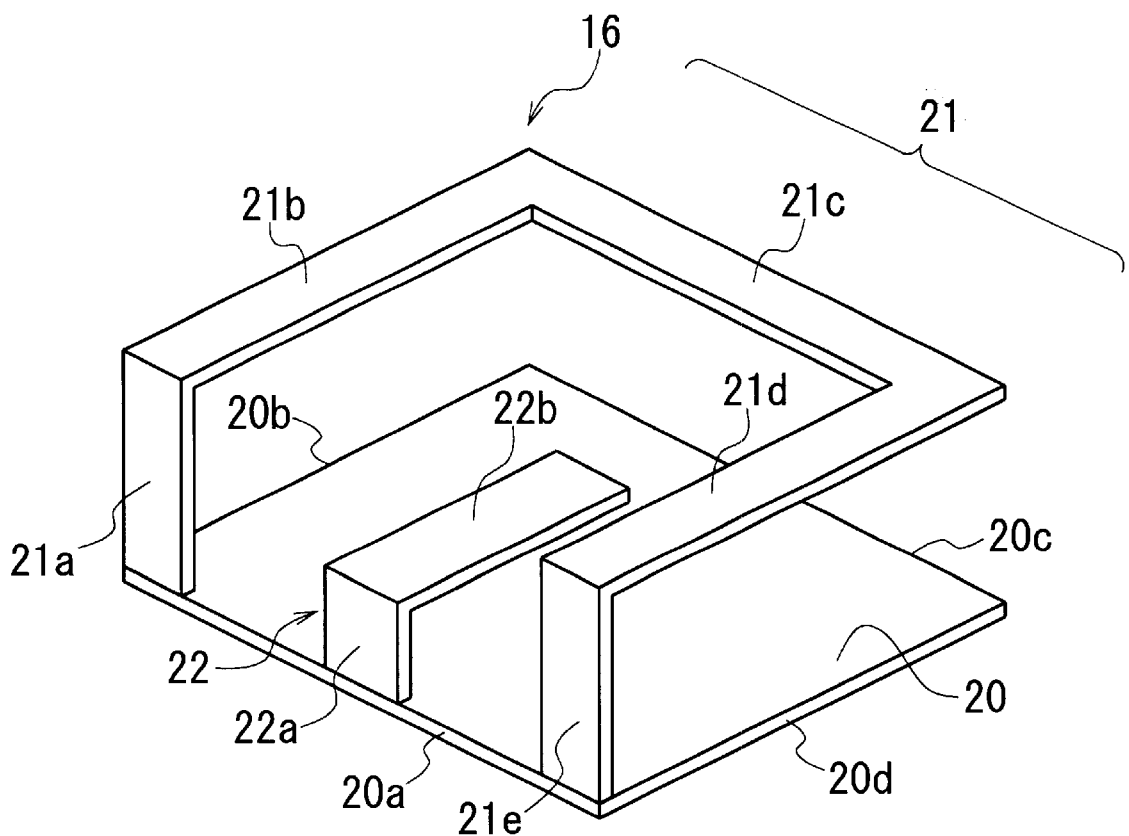
FIG. 5 is a schematic, partial, perspective view of the elastic connection member used in the LCD device according to the first embodiment of FIG. 3.

As clearly shown in FIG. 5, the conductive connection member 16 is formed by a base part 20, a first spring part 21, and a second spring part 22. The base part 20, which is contacted with the outer surface of the second substrate 12, is formed as a rectangular plate or sheet of 4 mm×5 mm. The first and second spring parts 21 and 22 are extending from one side 20a of the base part 20 in a direction perpendicular to the second substrate 12 and the base part 20 (i.e., along the thickness direction of the second substrate 12).

The first spring part 21 has five strips 21a, 21b, 21c, 21d, and 21e. The end of the strip 21a is connected to the side 20a of the base part 20 at a corner of the part 20. Similarly, the end of the strip 21e is connected to the side 20a of the base part 20 at another corner of the part 20. The strips 21a and 21e, which are perpendicular to the part 20, have the same length approximately equal to the total thickness (e.g., 1.6 mm) of the first and second substrates 11 and 12, the gap between the substrates 11 and 12, and the conductive layer 13.

The strips 21b and 21d extend along the corresponding sides 20b and 20d of the base part 20, respectively. The near ends of the strips 21b and 21d are connected to the corresponding ends of the strips 21a and 21e, respectively. The opposite ends of the strips 21b and 21d are respectively connected to the corresponding ends of the strip 21c, where the strip 21c extends along the corresponding side 20c of the part 20. Thus, the three strips 21b, 21c, and 21d form an approximate U-character shape. The strips 21b, 21c, and 21d are approximately parallel to the base part 20 when they are attached to the substrates 11 and 12. The strips 21b and 21d have a length allowing the strip 21c to be entirely contacted with the conductive layer 13 on the first substrate 11.

The second spring part 22 has two strips 22a and 22b. The end of the strip 22a is connected to the side 20a of the base part 20 at the middle point of the side 20a. The strip 22a is approximately perpendicular to the part 20 and parallel to the strips 21a and 21e. The strip 22a has a length approximately equal to the total thickness (e.g., 1.0 mm) of the first substrate and the grounding electrode 15, which is smaller than that of the strips 21a and 21e. The strip 22b has a length allowing the end of the strip 22b to be contacted with the grounding electrode 15 on the second substrate 12.

The connection member 16 has the structure as explained above. Therefore, if an external force is applied to the first spring part 21 while the base part 20 is fixed, the first spring part 21 can be deformed elastically in a direction perpendicular to the base part 21. Similarly, the second spring part 22 also can be deformed elastically in the same direction. The elastic deformation of the parts 21 and 22 can occur independently. As a result, even if the thickness of the first and second substrates 11 and 12 fluctuate, the first and second spring parts 21 and 22 can be respectively contacted with the grounding electrode 15 and the conductive layer 13 stably while applying proper pressing forces to the electrode 15 and the layer 13, respectively.

In the first embodiment, the connection member 16 is made of stainless steel. However, it may be made of any other conductive metallic material having a spring function, such as phosphor bronze and beryllium copper. Needless to say, the dimensions of the member 16 may be adjusted so as to fit the size of the first and second substrates 11 and 12.

Moreover, the contact pressure of the first spring part 21 applied to the conductive layer 13 is set to be approximately equal to 30 gw/cm$^2$ (=2941.995 Pa) or lower. This is due to the result of the inventor's test carried out in the following way.

Specifically, the contact pressure of the first spring part 21 applied to the conductive layer 13 was set as approximately 40 gw/cm$^2$ (=3922.66 Pa) to 50 gw/cm$^2$ (=4903.325 Pa). In this case, the display area of the LCD device of the normally black mode was partially turned white, thereby degrading the display quality. If the contact pressure of the first spring part 21 was set to be approximately equal to 30 gw/cm$^2$ (2941.995 Pa) or lower, such the problem did not occur.

Unlike the first spring part 21, such a limitation does not necessary for the contact pressure of the second spring part 22 applied to the grounding electrode.15. This is because it is sufficient for the part 21 to engage simply with the second substrate 12 for electrical connection.

With the horizontal electric-field type LCD device according to the first embodiment, the protecting conductive layer 13 formed on the first substrate 11 and the grounding electrode 15 formed on the second substrate 12 are electrically connected to each other by way of the conductive connection member 16. Thus, even if electrification occurs on the first or second substrate 11 or 12, electric charges created on the first or second substrate 11 or 12 flow quickly to the outside of the device through the connection member 16, the grounding electrode 15, the driver IC, and the PWB 19. As a result, the display quality does not degrade due to electrification, which means that good display quality is realized.

Also, the connection member 16 has the base part 20 engaged with the second substrate 12, the first spring part 21 engaged with the conductive layer 13 on the outer surface of the second substrate 12, and the second spring part 22 engaged with the grounding electrode 15. Therefore, the structure of the LCD device can be made thin and simple and at the same time, the member 16 can be easily attached to the first and second substrates 11 and 12 and easily detached therefrom, which means that the driver IC 18 can be easily replaced.

For example, supposing that the driver IC 18 needs to be replaced according to the result of the display test of the LCD device, the connection member 16 can be easily detached, the replacement process of the IC 18 can be simplified.

Figure 2:
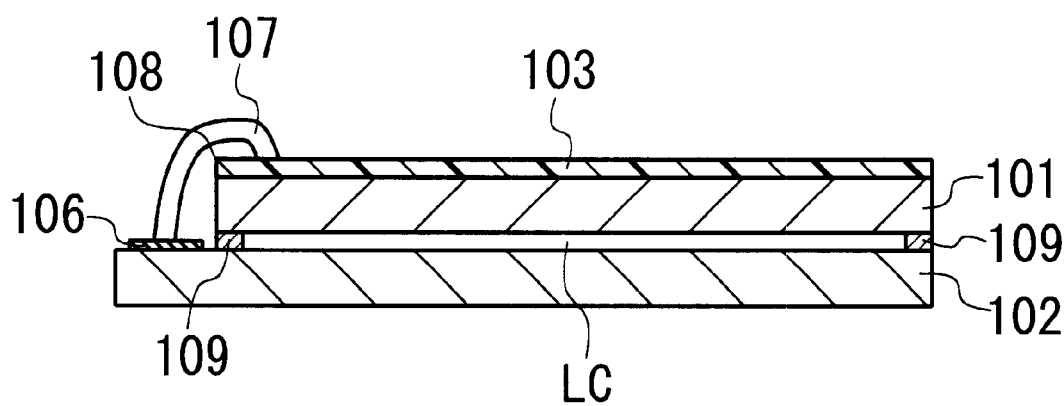
FIG. 2 is a schematic cross-sectional view of another prior-art horizontal electric-field type LCD device.

Furthermore, since the cable 107 and the conductive rubber layer 105 used in the prior-art LCD devices shown in FIGS. 1 and 2 are not necessary, no complicated process is required for electrically interconnecting the conductive layer 13 with the grounding electrode 15.

Moreover, elastic deformation occurs independently in the first and second spring parts 21 and 22 of the connection member 16. Therefore, proper pressing forces can be provided for the respective engagements of the first and second spring parts 21 and 22, which stabilizes these engagements.

According to the result of the inventor's test, it was found that the initial resistance between the conductive layer 13 and the grounding electrode 15 was as low as 0.2 to 0.5 kΩ. Also, it was confirmed that when an external voltage of 10 kV was applied to the outer surface of the polarizer plate 14a on the first substrate 11, an abnormal displaying phenomenon occurred. However, it promptly disappeared in a short period of 0.5 sec or less and then, a normal display image was recovered.

On the other hand, in the prior-art LCD device shown in FIG. 1, it was found from the inventor's test result that the adhesion strength between the glass substrate and the metal tape was 40 g to 150 g at an adhesion area of 10 mm², and that a wide adhesion area equal to 10 mm² or greater was needed for reliable adhesion. This means that the conductive tape was unable to be made more compact.

Furthermore, it was found that the electric resistance of the tape was increased to 10 MΩ or higher after a heating test for 500 hours at a temperature of 50° C. and a humidity of 85%. This means that desired reliability was not obtained in the prior-art LCD device shown in FIG. 1.

Second Embodiment

Figure 6:
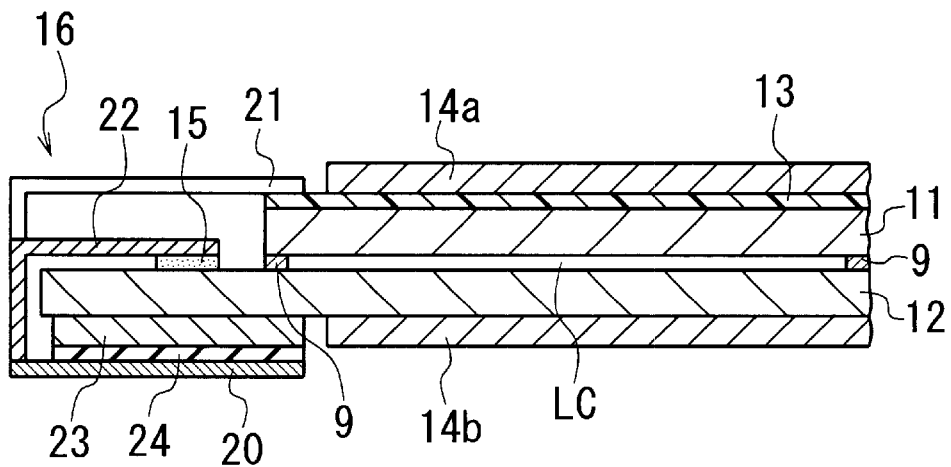
FIG. 6 is a schematic cross-sectional view of a horizontal electric-field type LCD device according to a second embodiment of the invention.

FIG. 6 shows the configuration of a horizontal electric-field type LCD device according to a second embodiment. This device has the same configuration as that of the LCD device according to the first embodiment shown in FIGS. 3 to 5, except that a rubber sheet 23 and a double-coated tape 24 are inserted between the outer surface of the second substrate 12 and the base part 20 of the connection member 16. The rubber sheet 23 is attached to the base part 20 with the tape 24. Therefore, the explanation about the same configuration is omitted here for simplification of description by attaching the same reference symbols as those used in the first embodiment in FIG. 6.

It is needless to say that the LCD device according to the second embodiment has the same advantages as those of the LCD device according to the first embodiment. The rubber sheet 23 has a larger friction coefficient than that of the member 16 with respect to the second substrate 12. Therefore, the device according to the second embodiment has an additional advantage that the connection or engagement between the connection member 16 and the second substrate 12 is ensured even if any external vibration and/or shock is/are applied to the LCD device.

In the second embodiment, the rubber sheet 23 is made of silicone rubber. However, it is needless to say that any other rubber, such as natural rubber, butyl rubber, urethane rubber may be used for this purpose. Also, instead of the double-coated tape 24, any adhesion may be used if it adheres the rubber sheet 23 to the connection member 16.

Instead of the rubber sheet 23, any other member may be used for reinforcing the engagement of the member 16 with the substrate 12.

In the first and second embodiments, the conductive layer 13 is formed on the outer surface of the first substrate 11, and the polarizer plate 14a is formed on the layer 13. Also, the layer 13 is located on the first substrate 11 on which the display and reference electrodes and the TFTs are not provided. However, the present invention is not limited to this structure. For example, the polarizer plate 14a itself may be formed conductive, in which the plate 14a serves as the layer 13. The layer 13 may be located on the second substrate 11 on which the display and reference electrodes and the TFTs are provided.

Moreover, the conductive layer 13 may be made of any material having an electrical conduction effective for its intended purpose, such as a metal, and a conductive resin or plastic.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A horizontal electric-field type LCD device comprising:

(a) a first transparent substrate;

(b) a protecting conductive layer formed on an outer surface of said first substrate;

(c) a second transparent substrate coupled with said first substrate to form a space between inner surfaces of said first and second substrates;
said second substrate having an extended part that extend from the periphery of said first substrate;

(d) a grounding electrode formed on said inner surface of said extended part of said second substrate;

(e) a liquid crystal confined in said space formed between said inner surfaces of said first and second substrates; and (f) a conductive, elastic connection member for electrically interconnecting said conductive layer on said first substrate with said grounding electrode on said second substrate;
said connection member having a base part engaged with an outer surface of said second substrate, a first spring part engaged with said conductive layer on said first substrate, and a second spring part engaged with said grounding electrode on said second substrate.

2. The device according to claim 1, wherein said first spring part and said base part of said connection member form an approximately U-shaped cross section, and said second spring part and said base part of said connection member form an approximately U-shaped cross section.

3. The device according to claim 1, wherein said connection member is made of a material selected from the group consisting of stainless steel, phosphor bronze, and beryllium copper.

4. The device according to claim 1, wherein said first spring part of said connection member is designed to apply a pressure of approximately 30 gw/cm² (=2941.995 Pa) or lower to said protecting conductive layer.

5. The device according to claim 1, wherein each of said first and second spring parts of said connection member is elastically deformed with respect to said base part of said member.

6. The device according to claim 1, wherein each of said first and second spring parts of said connection member applies a pressure toward said base part due to its elasticity.

7. The device according to claim 1, wherein said base part of said connection member is approximately flat, said first spring part of said member is U-shaped, and said second spring part of said member is linearly shaped;
and wherein a middle part of said first spring part is contacted with said conductive layer and an end of said second spring part is contacted with said grounding electrode.

8. The device according to claim 1, wherein said base part of said connection member is engaged with said outer surface of said second substrate by way of a friction-increasing member.

9. The device according to claim 8, wherein said friction-increasing member is an elastic sheet.

10. The device according to claim 9, wherein said elastic sheet is adhered to said base part of said connection member.

* * * * *